(12) United States Patent
Fasen (10) Patent No.: US 6,563,659 B1
(45) Date of Patent: May 13, 2003

(54) METHOD AND APPARATUS FOR SERVO CODE BASED TAPE TENSION MEASUREMENT

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/521,651

(22) Filed: Mar. 8, 2000

(51) Int. Cl.[7] ............................................. G11B 15/093
(52) U.S. Cl. ..................................... 360/71; 242/334.6
(58) Field of Search ...................... 360/71, 69, 73.12, 360/77.12, 74.3, 74.4; 318/6; 242/334, 334.6

(56) References Cited

U.S. PATENT DOCUMENTS

| | | | |
|---|---|---|---|
| 3,910,527 A | 10/1975 | Buhler et al. | ............... 242/186 |
| 3,984,065 A | 10/1976 | Bosetti et al. | |
| RE32,967 E | * 6/1989 | St. John et al. | .......... 242/534.1 |
| 5,008,765 A | 4/1991 | Youngquist | |
| 5,262,908 A | 11/1993 | Iwamatsu et al. | |
| 5,392,976 A | 2/1995 | Nelson et al. | |
| 5,395,066 A | 3/1995 | Yokoyama et al. | ...... 242/334.2 |
| 5,432,652 A | 7/1995 | Comeaux et al. | |
| 5,434,732 A | 7/1995 | Schwarz et al. | |
| 5,448,438 A | 9/1995 | Kasetty | |
| 5,450,257 A | 9/1995 | Tran et al. | |
| 5,481,417 A | 1/1996 | Yokoyama et al. | ...... 360/73.08 |
| 5,488,525 A | 1/1996 | Adams et al. | |
| 5,523,904 A | 6/1996 | Saliba | |
| 5,572,378 A | * 11/1996 | Schwarz et al. | ....... 360/74.3 X |
| 5,572,392 A | 11/1996 | Aboaf et al. | |
| 5,574,602 A | 11/1996 | Baca et al. | |
| 5,615,068 A | 3/1997 | Matsuda et al. | |
| 5,626,304 A | 5/1997 | Mukai | |
| 5,629,813 A | 5/1997 | Baca et al. | |
| 5,631,788 A | 5/1997 | Richards | |
| 5,818,667 A | 10/1998 | Larson | |
| 5,982,711 A | 11/1999 | Knowles et al. | ......... 360/77.12 |
| 6,222,698 B1 | * 4/2001 | Barndt et al. | ................. 360/76 |

FOREIGN PATENT DOCUMENTS

| | | | |
|---|---|---|---|
| EP | 0443810 A2 | | 2/1991 |
| EP | 0883110 A2 | | 1/1998 |
| JP | 5901712 A | * | 1/1984 |
| JP | 3-250470 | | 11/1991 |
| JP | 6-338185 | | 12/1994 |
| JP | 9-063088 | | 3/1997 |

OTHER PUBLICATIONS

US 5,886,585, 3/1999, Yanagihara (withdrawn)

* cited by examiner

Primary Examiner—David Hudspeth
Assistant Examiner—James L Habermehl

(57) ABSTRACT

A tape drive for use with a magnetic recording tape, the tape drive including a system for determining the amount of tension on the magnetic recording tape, the magnetic recording tape having a length in the direction of tape travel and a width in the direction perpendicular to the length, the tape having first and second servo bands thereon spaced apart in a direction transverse to the length of the tape, the tape drive including servo elements configured to read the first and second servo bands on the tape; and a servo processor configured to determine changes in distance between the first and second servo bands, and to detect changes in the amount of tension along the length of the tape based on the determined changes in distance between the first and second servo bands. A method of determining tension on a magnetic recording tape that has a length in the direction of tape travel and a width in the direction perpendicular to the length, the tape having first and second servo bands thereon, the method including reading the first and second servo bands on the tape; determining the distance between the first and second servo bands; and determining the amount of tension along the length of the tape in response to the determined distance between the first and second servo bands.

20 Claims, 7 Drawing Sheets

METHOD AND APPARATUS FOR SERVO CODE BASED TAPE TENSION MEASUREMENT

FIELD OF THE INVENTION

The invention relates to recording and reading data from a magnetic recording tape. More particularly, the invention relates to tape servo systems, to arrangements of servo and data tracks on a magnetic recording tape, and to methods and apparatus for sensing tension in a magnetic recording tape.

BACKGROUND OF THE INVENTION

Accurate tension control while moving tape in a reel-to-reel tape transport is needed to maintain proper contact between the tape and the read-write head, low tape wander and uniform tape packing on the takeup reel.

Typical prior art tension sensors are implemented with some sort of forced lever arm which protrudes into the tape path. For example, U.S. Pat. No. 5,395,066 to Yokoyama et al. (incorporated herein by reference) discloses a tape tension sensor that uses a movable pin, and a tape tension control system that adjusts tape tension responsive to the tape tension sensor. With prior art tension sensors that used a forced lever arm, the deflection of the lever arm is then an indication of the tape tension and the tension variation. The force of the element protruding into the tape path is balanced by the normal force created by the tape tension. As the tape tension changes, the forces are unbalanced and the resulting force changes the amount of protrusion into the tape path by the element until a new equilibrium is established.

The deflection of the protruding element can be measured with a variety of position measuring methods such as capacitance detection, laser interferometry and piezoelectric sensing.

A difficulty with this prior art approach is that the mass of the protruding element must be moved in response to the unbalanced force created by a variation in the tape tension. The movement of this mass limits how rapidly the tension force can be countered by the protrusion force. The result is a bandwidth limitation where beyond a certain frequency of tension variation, the sensor will fail to indicate the true tension variation.

Because some sort of spring is required to create the protrusion force which is balanced by the tension force, a spring-mass system is created. Such spring-mass systems will have a resonant characteristic which can limit the useful bandwidth to some fraction of the frequency of the resonance.

The sensing of the position of the protruding element can also present difficulties. The sensing is typically analog in nature and will have noise, non-linearities, environmental drift and calibration errors.

Attention is directed to various issued U.S. patents. U.S. Pat. No. 5,392,976 to Nelson et al. (incorporated herein by reference) discloses a tape duplication system in which a pressurized fluid is used for sensing tape tension based on tape width, among other things.

U.S. Pat. No. 5,982,711 to Knowles et al. (incorporated herein by reference) is assigned to the assignee of the present invention and discloses calculating lateral expansion of tape by comparing servo signals from two servo bands.

U.S. Pat. No. 5,262,908 to Iwamatsu et al. (incorporated herein by reference) relates to a tracking control device that has at least two servo signal reproducing heads for reproducing servo signals for tracking from a plurality of servo tracks. The Iwamatsu et al. patent does not relate to tension sensing.

U.S. Pat. No. 5,432,652 to Comeaux et al. (incorporated herein by reference) discloses the use of multiple servo tracks on a magnetic recording tape.

SUMMARY OF THE INVENTION

The invention provides a tension sensor that uses servo signals read from the read head, to avoid the problems of prior art tension sensors.

Another aspect of the invention provides a method of determining tape tension comprising sensing a change in lateral width of the tape and determining change in the tension of the tape in response to the sensed change in lateral width.

Another aspect of the invention provides a tape drive for use with a magnetic recording tape, the tape drive including a system for determining the amount of tension on the magnetic recording tape, the magnetic recording tape having a length in the direction of tape travel and a width in the direction perpendicular to the length, the tape having first and second servo bands thereon spaced apart in a direction transverse to the length of the tape, the tape drive comprising servo elements configured to read the first and second servo bands on the tape; and a servo processor configured to determine changes in distance between the first and second servo bands, and to detect changes in the amount of tension along the length of the tape based on the determined changes in distance between the first and second servo bands.

Another aspect of the invention provides a method of determining tension on a magnetic recording tape that has a length in the direction of tape travel and a width in the direction perpendicular to the length, the tape having first and second servo bands thereon, the method comprising reading the first and second servo bands on the tape; determining the distance between the first and second servo bands; and determining the amount of tension along the length of the tape in response to the determined distance between the first and second servo bands.

Other features and advantages of the invention will become apparent to those of ordinary skill in the art upon review of the following detailed description, claims, and drawings.

DETAILED DESCRIPTION OF THE INVENTION

Figure 1:
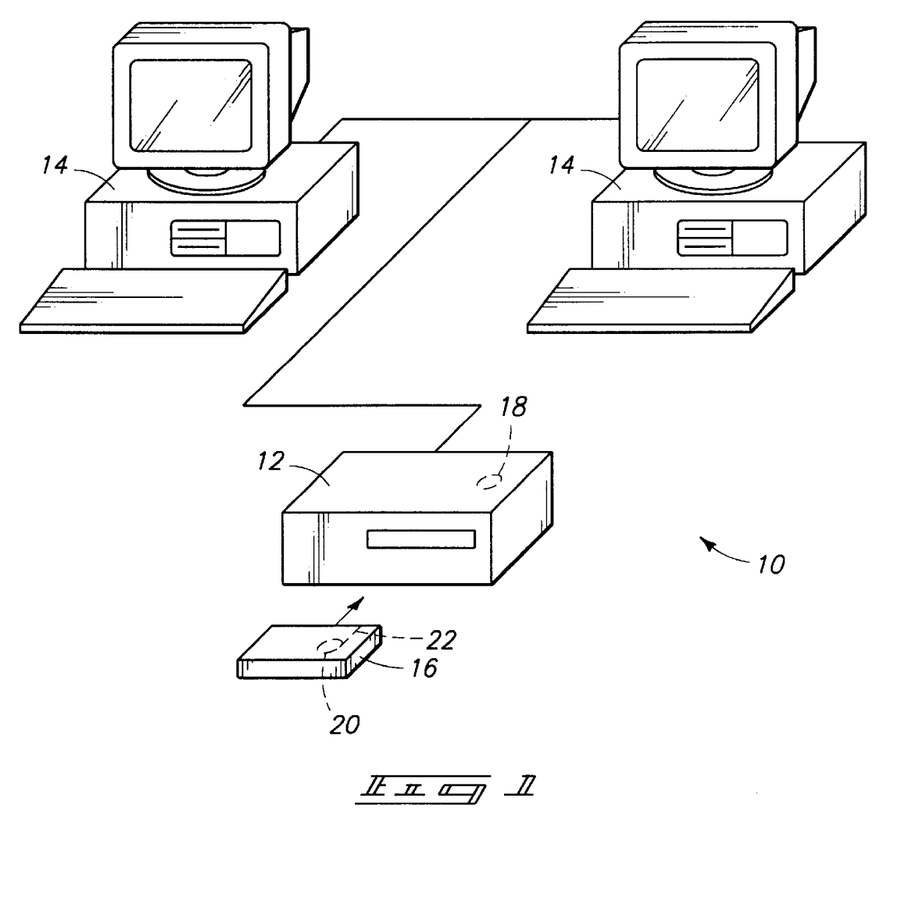
FIG. 1 is a perspective view of a computer network embodying the invention and including a magnetic recording tape drive.

FIG. 1 shows a computer network 10 including a data storage device or system 12 embodying the invention, and including one or more computers 14. The data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10. In the illustrated embodiment, the data storage device 12 is a linear recording tape drive.

The tape drive 12 is used with tape cartridges 16, in one embodiment of the invention. In an alternative embodiment of the invention, the tape drive 12 is a reel to reel tape drive of the type that supports open reels. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. While other widths can be employed, in the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, 24L, 24M, 24N, 24O, and 24P (24A–P) are defined across the width of the tape 22. The tracks 24A–P extend in the direction of the length of the tape 22.

Figure 2:
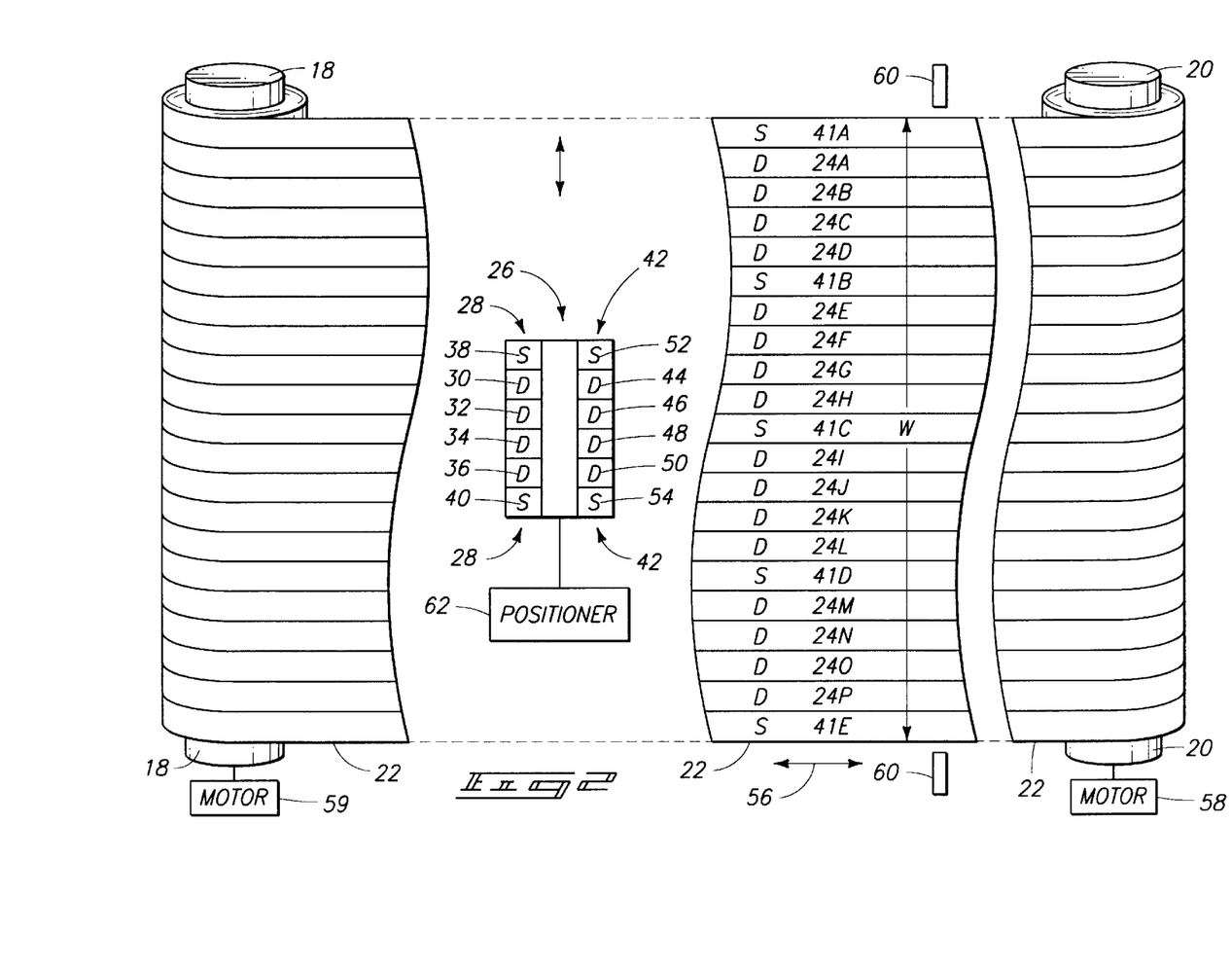
FIG. 2 is a diagrammatical perspective view illustrating an arrangement of servo elements and read/write elements on a head in the tape drive, and illustrating an arrangement of data tracks and servo bands on a tape on which the head operates.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, 41D, and 41E different from the data tracks 24. In the illustrated embodiment, the servo code is pre-written to the parallel bands 41A, 41B, 41C, 41D, and 41E by another servo writer that may or may not be included in the tape drive 12. In another embodiment, the servo elements 38 and 40 are used for writing servo code to the parallel bands.

In FIG. 2, four sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, 41D, and 41E by another servo writer that may or may not be included in the tape drive 12. In another embodiment, the servo elements 52 and 54 are used for writing servo code to the parallel bands.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor 59 drives the other of the reels 18 or 20. In an alternative embodiment, a capstan is used to drive the tape. The tape drive 12 may include conventional components such as tapes guides 60.

The servo and read/write elements of the second bump 42 are respectively parallel to the servo and read/write elements of the first bump 28, as shown in FIG. 2. In one embodiment, when the tape is traveling in the first direction (e.g., to the right in FIG. 2) and it is desired to write to the tape, the servo element 52 of the second bump 42 reads servo code from the servo band 41B on the tape to produce a servo signal, the read/write element 30 of the first bump 28 writes data to the track 24E, the read/write element 44 of the second bump 42 reads data from the track 24E, the read/write element 32 of the first bump 28 writes data to the track 24F, the read/write element 46 of the second bump 42 reads data from the track 24F, the read/write element 34 of the first bump 28 writes data to the track 24G, the read/write element 48 of the second bump 42 reads data from the track 24G, the read/write element 36 of the first bump 28 writes data to the track 24H, the read/write element 50 of the second bump 42 reads data from the track 24H, and the servo element 54 of the second bump 42 reads servo code from the servo band 41C to produce a servo signal.

When the tape is traveling in the second direction (e.g., to the left in FIG. 2) and it is desired to write to the tape, the servo element 38 of the first bump 28 reads servo code from the servo band 41B on the tape to produce a servo signal, the read/write element 30 of the first bump 28 reads data from the track 24E, the read/write element 44 of the second bump 42 writes data to the track 24E, the read/write element 32 of the first bump 28 reads data from the track 24F, the read/write element 46 of the second bump 42 writes data to the track 24F, the read/write element 34 of the first bump 28 reads data from the track 24G, the read/write element 48 of the second bump 42 writes data to the track 24G, the read/write element 36 of the first bump 28 reads data from the track 24H, the read/write element 50 of the second bump 42 writes data to the track 24H, and the servo element 40 of the first bump 28 reads servo code from the servo band 41C to produce a servo signal.

Figure 3:
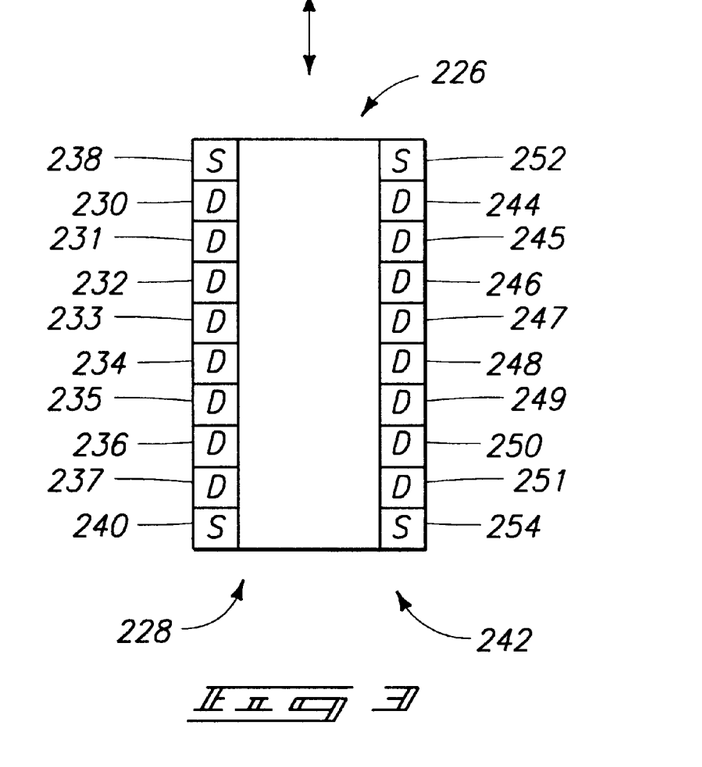
FIG. 3 is a diagrammatical perspective view illustrating an arrangement of servo elements and read/write elements on a head in accordance with an alternative embodiment of the invention.

FIG. 3 shows a head 226 in accordance with an alternative embodiment of the invention, wherein each of two bumps 228 and 242 includes eight read/write elements and two servo elements. More particularly, the first bump 228 of the head 226 includes servo elements 238 and 240, and read/write elements 230, 231, 232, 233, 234, 235, 236, and 237 between the servo elements 238 and 240, and the second bump 242 of the head 226 includes servo elements 252 and 254, and read/write elements 244, 245, 246, 247, 248, 249, 250 and 251 between the servo elements 252 and 254. The head 226 operates on a tape having, of course, eight data tracks between each pair of servo bands.

By employing two servo elements for reading from two servo bands, defects in the tape can be tolerated. Because the servo elements bracket the read/write elements, tape defects of maximum widths can be tolerated. If one servo band on the tape is corrupted, the other servo band is used.

Figure 4:
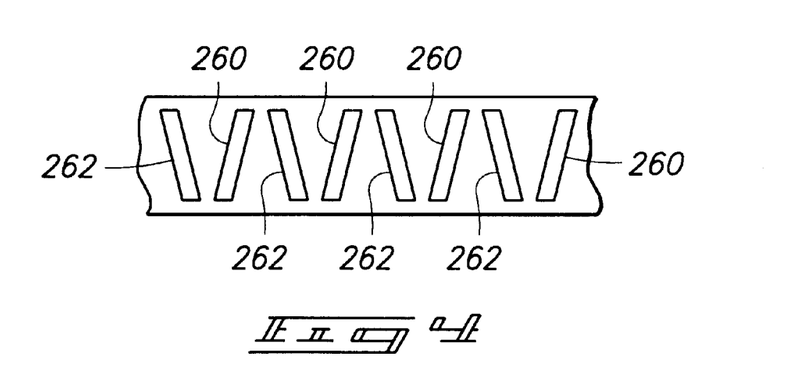
FIG. 4 is a diagrammatical plan view illustrating one possible servo band configuration that could be included in the magnetic recording medium shown in FIG. 2.

FIG. 4 illustrates a servo band configuration that could be employed in one embodiment of the invention for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262. The servo code thus includes two elements: 260, which are written with a forward slope or positive azimuth angle, and transitions 262, which are written at a backward slope or negative azimuth angle and may or may not be symmetrical with respect to the transition 260. The time difference between read back pulses generated using a servo element is used to indicate the servo element's position in a servo band. By using a high resolution timing measurement, a high resolution position measurement is achieved. See European Patent Application EP 0690442 A2 for detailed information regarding servo systems that could be employed in the tape drive 12. Thus, the pattern is written with one frequency on one side of the band, and another frequency on the other side of the band.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D. This leads into a discussion of but one advantage of the invention. The illustrated arrangement of servo elements and data elements on the head makes for efficient use of available space on the tape for servo bands. Servo bands are spaced on the tape to match the distance between the servo elements on the head. It is thus possible to share bands between one data track set and the adjacent data track set. This tape configuration has no more servo overhead than would a system that used only a single servo element per bump, except for one extra servo band at one of the edges of the tape.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

Figure 5:
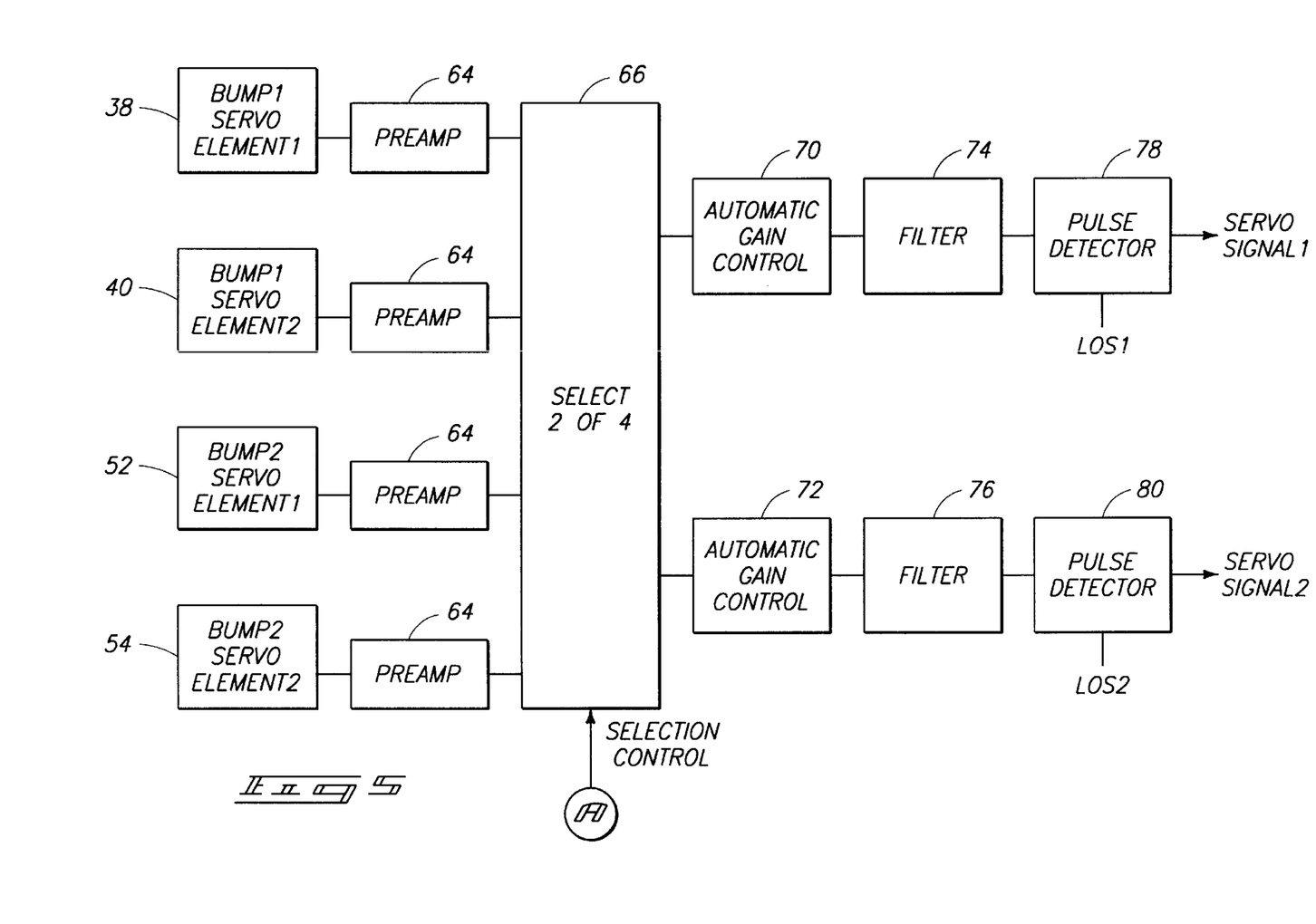
FIGS. 5–6 provide a block diagram illustrating a servo system including the servo elements of FIG. 2, for maintaining the position of the head relative to desired tracks and bands of the magnetic recording medium, and for maintaining the speed of travel of the magnetic recording medium relative to the head.
Figure 6:
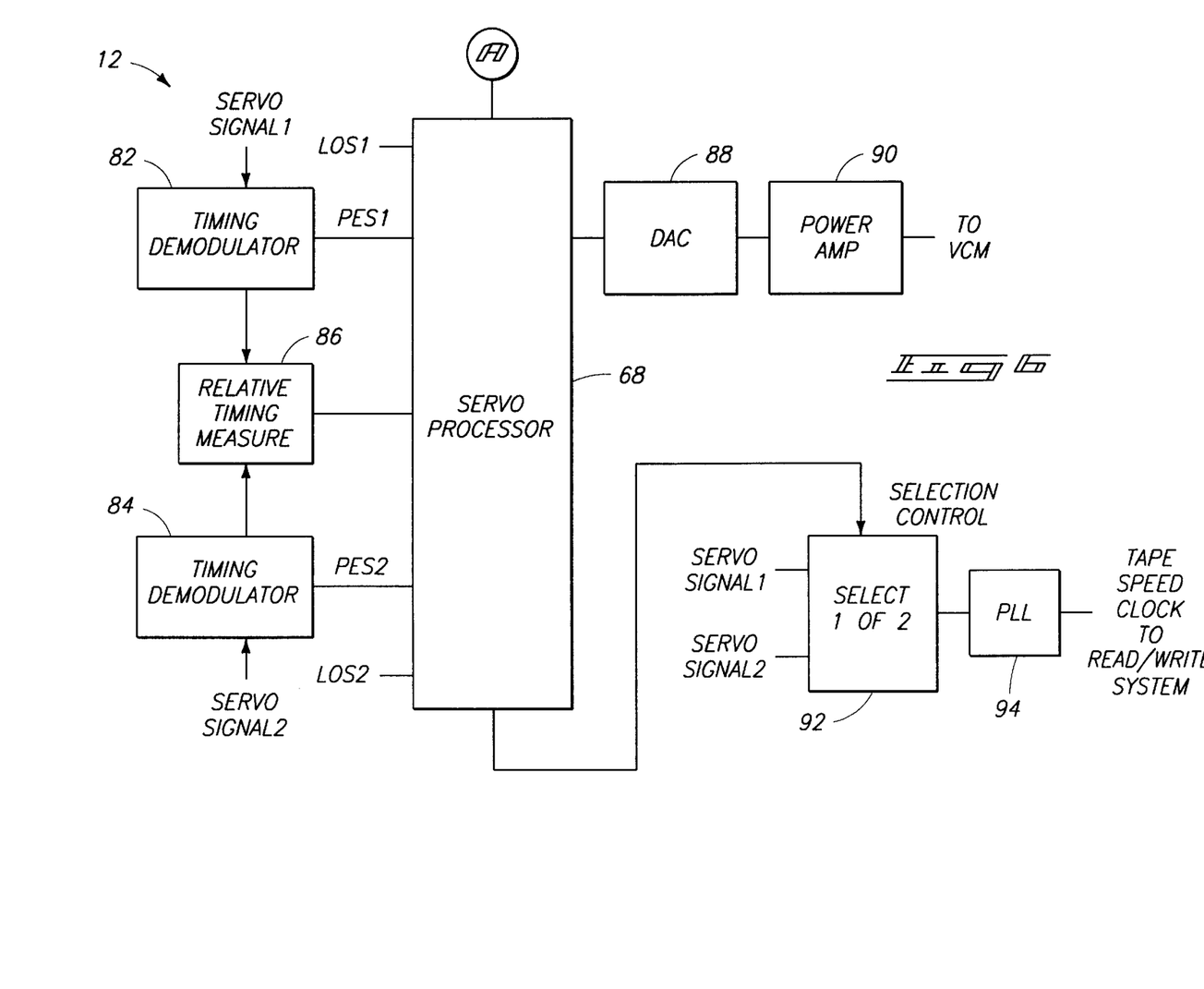

As shown in FIGS. 5–6, the tape drive 12 includes preamps 64 respectively coupled to the servo elements 38, 40, 52, and 54, and amplifying servo signals read by the servo elements which are reading servo code. This will be either the elements 38 and 40, or the elements 52 and 54, depending on the direction of tape travel, as described above. More particularly, the tape drive 12 includes a selection or switching circuit 66, coupled to the preamps 64, and enabling or using the preamps associated with the servo elements which are reading the servo code.

The tape drive 12 further includes a servo processor 68 which sends a selection control signal to the circuit 66 to select the appropriate pair of preamps depending on the direction of tape travel.

The tape drive 12 further includes automatic gain control circuits 70 and 72 respectively coupled to the preamps associated with the servo elements which are reading the servo code. The tape drive 12 also includes filters 74 and 76 respectively coupled to the automatic gain control circuits 70 and 72 to filter the signals produced by the automatic gain control circuits. In the illustrated embodiment, the filters 74 and 76 are band pass filters, and are used to remove noise. The tape drive 12 further includes first and second pulse detectors 78 and 80 respectively coupled to the filters 74 and 76. The pulse detectors produce servo signals, "SERVO SIGNAL1" and "SERVO SIGNAL2." The pulse detectors also determine if either of the servo bands is corrupted. If so, the pulse detector associated with the servo element reading the corrupted servo band produces a signal LOS1 or LOS2 signifying there is a loss of signal. This loss of signal information is passed to the servo processor so it can determine whether to use the signal produced by one servo element or another. In one embodiment, if neither servo band is corrupted, servo information from both of the servo elements that are reading servo code is used, and is combined mathematically (e.g., averaged in one embodiment).

The tape drive 12 further includes timing demodulators 82 and 84 which receive timing signals "SERVO SIGNAL1" and "SERVO SIGNAL2" produced by the pulse detectors. The timing demodulators 82 and 84 produce respective position error signals PES1 and PES2 which are passed to the servo processor 68. The tape drive 12 further includes a relative timing measure circuit 86 coupled to the timing demodulators 82 and 84, and which determines the difference in timing error signals produced by the timing demodulators 82 and 84. This Delta Time signal is also passed to the servo processor 68. The servo processor 68 uses the signals from the timing demodulator 82, the timing demodulator 84, and the relative time measure circuit 86 to accurately position the head 26 over the tracks from which the read/write elements are reading or to which the read/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor. In one embodiment, the tape drive adjusts the position of the head based on the average of PES1 and PES2.

The tape drive 12 further includes a selection circuit or switching circuit 92 controlled by the servo processor 68. The circuit 92 is coupled to the pulse detectors 78 and 80, and the servo processor selects the appropriate pulse detector output by monitoring the LOS1 and LOS2 signals and determining whether and which servo signal has been lost. The tape drive 12 further includes a phase locked loop 94 coupled to the circuit 92. The phase locked loop provides a tape speed clock which is used as a clock to write data to the tape. The tape speed clock can also be used in maintaining the speed of tape travel or can be used as a read reference clock.

One aspect of the invention provides a tension sensor that uses signals from a read head, such as the tape head 26, to avoid the problems of prior art tension sensors. More particularly, in the illustrated embodiment, servo signals are used to determine tape tension. In a tape drive of the type disclosed above, there are at least two servo elements (e.g., 38 and 40, or 52 and 54) spaced apart in the direction of the width of the tape (the width being defined as transverse to the direction of tape travel). The servo elements read servo information from parallel, spaced apart, servo tracks on the tape. During normal operation, lateral position error signals PES1 and PES2 are generated from both servo elements that are reading servo code at the time (e.g., 38 and 40, or 52 and 54).

Figure 7:
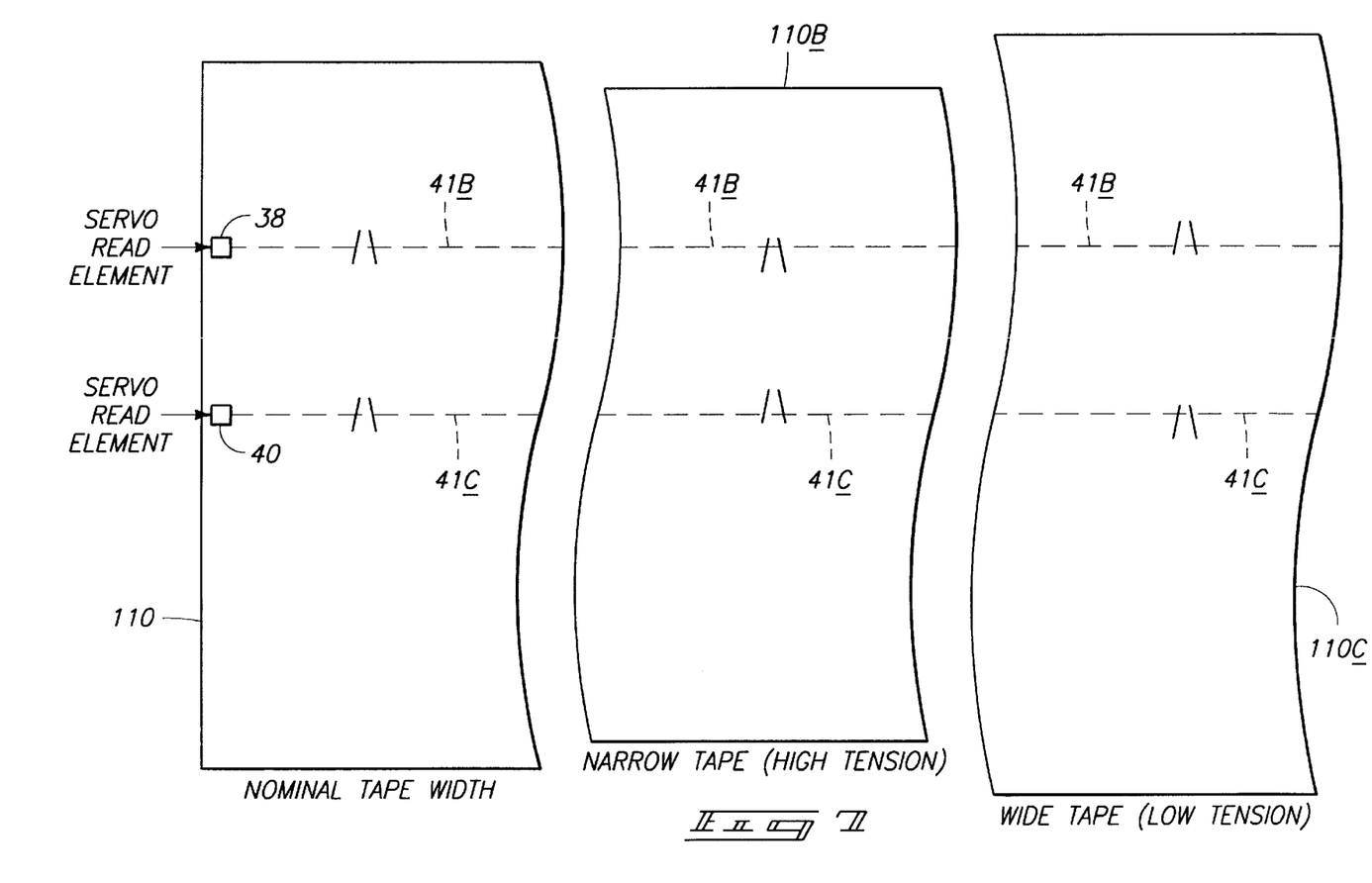
FIG. 7 is a diagrammatical plan view illustrating servo bands of an alternative configuration that could be included in the magnetic recording medium shown in FIG. 2 and showing the effects of variations in tension on the servo band, and illustrating how tension is determined by determining change in width, in one aspect of the invention.

To derive a tension signal, the fact that the lateral width of the tape will vary in response to a longitudinal tension change (see FIG. 7) is used by the servo processor 68. There are inherent properties of the tape material which will determine the amount of width variation a certain tension variation will cause. The equation below relates tape properties to the width sensitivity to tension.

$$\text{WidthChange/Tension}=Mu/\text{TapeThickness}/E\ (um/N)$$

where:
Mu=Poisson's ratio=0.3 (in one embodiment)
TapeThickness=9 μm (in one embodiment)
E=Young's Modulus $7\times10^{-3}$ N/μm² (in one embodiment) which results in a width change of 4.76 μm/N over the entire 12650 μm tape width (one half inch). These figures for Mu, tape thickness, and Young's Modulus are published figures for a tape of one material, known in the industry as PEN material, and are given by way of example only. Other figures would be applicable for different types of tape materials and may be available from the manufacturer, from publications, or may be determined by experimentation. Young's Modulus provides an indication of how much the tape will stretch per unit of force applied and varies, for example, depending on the type of material and thickness. Poisson's ratio provides an indication of how much lateral displacement occurs per unit of longitudinal displacement. For a width change of 4.76 μm/N, a tension to width relationship can be established as follows:

$$4.76\ \mu\text{m/N}\div12650\ \mu\text{m}\times100\%=0.0376\%/\text{N}$$

With this tension to width relationship established, a method of measuring the tape width variation that is employed is to take the difference between the first and second position error signals.

$$\text{Tension}=\text{PES1}-\text{PES2}$$

In one aspect of the invention, the tape drive 12 is designed for use with LTO format tapes. LTO or, Linear Tape-Open, is a format that defines, among other things, the number of servo bands, the spacing between the servo bands, and the servo code pattern. More information about LTO can be obtained from the assignee of the present invention or found on the Internet by searching for LTO. The servo code pattern for an LTO tape is illustrated diagrammatically in FIG. 8 and includes multiple adjacent forward and rearward sloping transitions.

If the tape drive 12 is used with LTO tapes, the space between the first and second servo reading elements (e.g., 38 and 40, or 52 and 54) is 2859 μm, so a 0.1 N tension change will cause a 0.00376%=0.108 μm change in the position of the servo bands over this space. Because much of the tape wander induced position noise will be canceled by calculating the difference in position signals, the noise present in the tension signal is much less than either of the position signals themselves.

Because only the width of the tape is changing in response to a tension change, the response can be very rapid. A high rate of position signal information is required and available for head position control and this same rate of information is therefore also available for the tension signal. In LTO format tapes, for example, a tension reading is available every 100 μm along the length of the tape.

The LTO format tape 110 shown in FIG. 7 has four servo band pairs across the width of the tape as does the tape shown in FIG. 2. Only the pair 41B, 41C is shown in FIG. 7 for simplicity. FIG. 7 illustrates that if the tension on the tape increases from a desired normal amount, the width of the tape is reduced (see 110B) and the transitions of servo bands 41B and 41C become closer together. Similarly, if the tension on the tape decreases below a desired normal amount, the width of the tape is increased (see 110C) and the transitions of the servo bands 41B and 41C become farther apart. This distance can be determined based on the frequencies sensed by the servo elements 38 and 40, because of the servo pattern. Change in tension is calculated based on change in width, using the relationship described above.

Because a tension signal can be generated for each of the four band pairs across the width of the tape in the LTO format, the gradient in tension across the tape can also be measured, if desired.

Because the width sensitivity to tension is a function of the tape formulation, a calibration of this tension signal is required. This can be accomplished by comparing the output of a conventional tension sensor to this servo code tension sensor for each tape formulation. More particularly, in one embodiment, a step change in the DC tension is commanded and the DC shift in the tension sensor is recorded and compared to the commanded tension step size. DC tension is controlled through knowledge of the tape pack diameters and the torque constants of the reel motors 58 and 59. Tape pack diameters can be determined by counting wraps and knowing the thickness of the tape.

After width sensitivity relative to tension is determined for various tape formulations, servo processors of production tape drives 12 are programmed with the appropriate width:tension relationship for the tape formulation or formulations that will be used with the tape drive. If the tape drive can accept multiple different tape formulations, the width:tension relationship can be selected from multiple programmed options based on a user input selection or identification of tape formulation, or based on determination of the formulation by the tape drive itself (e.g., by using a sensor).

Tilting of the tape or the head will not significantly affect the tension measurement.

For a 20 minute tilt limit:

$$2859 \ \mu m * (1-\cos(20/60 \text{ deg})) = 0.048 \ \mu m$$

$$0.048 \ \mu m / \ 0.8 \ \mu m / N = 0.06 \ N \text{ error}$$

This error will typically be a DC shift that occurs as the tape direction is reversed.

Because there is no protruding element that needs to move in order to measure tape tension, the invention overcomes the bandwidth and space problems of conventional tension sensors. The fact that the position signals are required for head positioning makes the additional cost of adding this tension sensor very low.

After tension is sensed, it can be adjusted. In one embodiment, the tape drive further adjusts tension responsive to the sensed tension; e.g., to a predetermined value or range. For example, a tension adjustment system such as the one disclosed in U.S. Pat. No. 5,395,066 to Yokoyama et al. (incorporated herein by reference) is used, in one embodiment.

Figure 8:
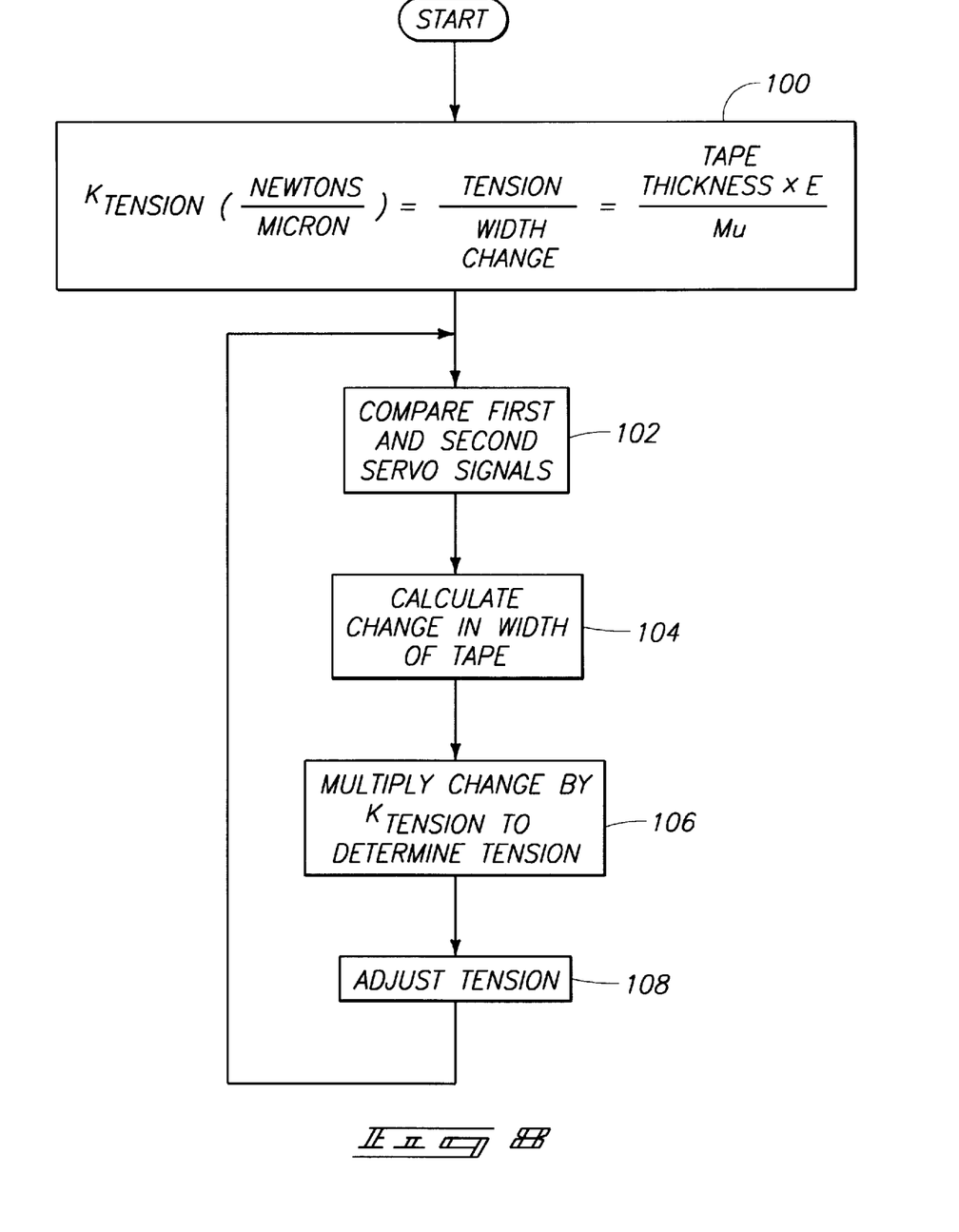
FIG. 8 is a flowchart illustrating how the arrangement of read/write elements and servo elements is used for determining change of width of a tape in a direction normal to the direction of tape travel and of determining tension on the tape based on change in width.

FIG. 8 is a flowchart that illustrates a method of calculating tension along the length of the tape based on change in width of the tape. Because of the configuration of the servo band (see FIG. 4 and discussion relating thereto), and because two servo elements are employed to simultaneously read servo code, change in width of the tape can be calculated by a processor. More particularly, change of width of the tape is calculated by taking the difference of position signals generated by the two servo elements that are reading servo code. These servo elements are spaced apart in the direction of the width of the tape.

In the embodiment of FIG. 8, in a step 100, a constant (indicated in FIG. 8 as $K_{TENSION}$, and having units in Newtons per micron) is set up representing the ratio of tension to width change (for the particular formulation of tape used with the particular tape drive) based on the relationship that tension divided by change in width equals tape thickness times Young's Modulus divided by Mu. After performing step 100, the processor proceeds to step 102.

In step 102, the first and second servo signals generated by the servo elements which are reading servo code are compared. After performing step 102, the processor proceeds to step 104.

In step 104, change in width of the tape is calculated; e.g., by subtracting PES2 from PES1. After performing step 104, the processor proceeds to step 106.

In step 106, the processor multiplies the change in width determined in step 104 by the constant set in step 100 to determine tension. After performing step 106, the processor proceeds to step 108.

In step 108, tension on the tape is adjusted. In one alternative embodiment, after performing step 108, a delay is imposed before the processor proceeds to step 102.

Various alternatives are possible, and the order of steps can be varied. For example, in one embodiment, instead of initializing a constant, a calculation using tape thickness, E, and Mu as variables can take place in step 106. In one embodiment, the variables could be changed or the constant could be changed if a user inputs that a different tape formulation is being used in the tape drive, or if the tape drive senses a change in tape formulation. For example, a tape cartridge could have a physical characteristic such as a hole or indentation in a predetermined location to signify a particular tape formulation, and the tape drive could mechanically sense presence or absence of the hole in that predetermined position to determine tape formulation.

Thus, a low cost sensor that does not cause additional tape wear or damage and not require much space has been disclosed. In order to achieve accurate tension control, a wide bandwidth, high resolution, low noise tension sensor of the invention has been provided.

Such a sensor can be used actively in the tape control loop to minimize tension variations and/or could be used to characterize the tension control accuracy, variation and noise.

The protection sought is not to be limited to the disclosed embodiments, which are given by way of example only, but instead is to be limited only by the scope of the appended claims.

What is claimed is:

1. A tape drive for use with a magnetic recording tape, the tape drive including a system for determining the amount of tension on the magnetic recording tape, the magnetic recording tape having a length in the direction of tape travel and a width in the direction perpendicular to the length, the tape having first and second servo bands thereon spaced apart in a direction transverse to the length of the tape, the tape drive comprising:

servo elements configured to read the first and second servo bands on the tape; and a servo processor configured to determine changes in distance between the first and second servo bands, and to detect changes in the amount of tension along the length of the tape based on the determined changes in distance between the first and second servo bands.

2. A tape drive in accordance with claim 1 wherein the servo processor determines changes in the amount of tension along the length of the tape using the relationship that change in width of the tape divided by tension on the tape equals Poisson's ratio divided by tape thickness divided by Young's Modulus.

3. A tape drive in accordance with claim 1 and further comprising a tape head including the servo elements, the tape head further including a plurality of read/write elements, wherein the servo elements are capable of reading both the first and second servo bands while the read/write elements read from or write to the tape.

4. A tape drive in accordance with claim 3 wherein the servo elements and read/write elements are arranged in columns on the tape head such that, in each column, all of the read/write elements of the column are located intermediate two servo elements.

5. A tape drive in accordance with claim 3 and further comprising a head positioner mechanically coupled to the head and configured to position the head in a direction transverse to the direction of travel of the tape, while the device reads from or writes to the tape, responsive to the servo elements reading the first and second servo bands.

6. A tape drive in accordance with claim 3 and further comprising a mechanism configured to operate on the tape to adjust the tension of the tape responsive to the servo processor determining changes in tension along the length of the tape.

7. A tape drive in accordance with claim 3 and further comprising first and second motors configured to drive respective reels, the reels being configured to receive windings of tape, wherein the first and second motors drive tape intermediate the windings relative to the tape head, and wherein the first and second motors adjust the tension on the tape responsive to the servo processor determining changes in tension along the length of the tape.

8. A tape drive in accordance with claim 3 wherein the servo elements and read/write elements are arranged in first and second columns on the tape head, with servo elements and read/write elements in each column, wherein the servo elements of the second column being configured to operate on the same servo bands as the servo elements of the first column, wherein when the read/write elements of the first column write to tracks, the servo elements of the second column read from the servo bands.

9. A tape drive in accordance with claim 8 and configured to operate on LTO format tapes.

10. A method of determining tension on a magnetic recording tape that has a length in the direction of tape travel and a width in the direction perpendicular to the length, the tape having first and second servo bands thereon, the method comprising:

reading the first and second servo bands on the tape;

determining the distance between the first and second servo bands; and determining the amount of tension along the length of the tape in response to the determined distance between the first and second servo bands.

11. A method in accordance with claim 10 and further comprising writing the first and second servo bands on the tape.

12. A method in accordance with claim 10 and further comprising providing the first and second servo bands on the tape, wherein the servo bands are parallel and spaced apart and extend along the length of the tape.

13. A method in accordance with claim 11 wherein the servo bands are written in the LTO format.

14. A method in accordance with claim 10 wherein the amount of tension on the tape is determined using the relationship that change in width of the tape divided by tension on the tape equals Poisson's ratio divided by tape thickness divided by Young's Modulus.

15. A method in accordance with claim 10 and further comprising controlling tension on the tape in response to determining the amount of tension on the tape.

16. A method in accordance with claim 11 and further comprising writing data in multiple tracks between the servo bands, after writing the servo bands.

17. A method in accordance with claim 10 wherein reading the first and second servo bands on the tape comprises providing a plurality of servo elements on a tape head, the method further comprising providing a plurality of read/write elements on the head, wherein the servo elements are capable of reading both the first and second servo bands while the read/write elements read from or write to the tape.

18. A method in accordance with claim 17 wherein the servo elements and read/write elements are arranged on the tape head in columns such that, in each column, all of the read/write elements of the column are located intermediate two servo elements.

19. A method of determining change in lengthwise tension on a magnetic recording tape that has a length in the direction of tape travel and a width in the direction perpendicular to the length, the tape having first and second servo bands thereon, the method comprising:

reading the first and second servo bands on the tape;

sensing changes in distance between the first and second servo bands; and determining changes in the amount of lengthwise tension on the tape in response to the sensed changes in distance between the first and second servo bands.

20. A method in accordance with claim 19 wherein reading the first and second servo bands on the tape comprises providing a plurality of servo elements on a tape head, the method further comprising providing a plurality of read/write elements on the head, wherein the servo elements are capable of reading both the first and second servo bands while the read/write elements read from or write to the tape, and wherein the servo elements and read/write elements are arranged on the tape head in columns such that, in each column, all of the read/write elements of the column are located intermediate two servo elements.

* * * * *